Jan. 31, 1961 J. M. COFFIN ET AL 2,970,255
CORE TESTING DEVICE

Filed March 25, 1959 2 Sheets-Sheet 1

INVENTORS
JOHN M. COFFIN
RAYMOND C. GRAHAM
BY
Alvin E. Hendrickson
ATTORNEY

INVENTORS
JOHN M. COFFIN
RAYMOND C. GRAHAM
BY
Alvin E. Hendrickson
ATTORNEY

United States Patent Office 2,970,255
Patented Jan. 31, 1961

2,970,255
CORE TESTING DEVICE

John M. Coffin, Menlo Park, and Raymond C. Graham, San Bruno, Calif., assignors to Lenkurt Electric Co., Inc., San Carlos, Calif., a corporation of Delaware Filed Mar. 25, 1959, Ser. No. 801,874

5 Claims. (Cl. 324—34)

The present invention relates to a multiple turn device or cup for measuring the permeability or "Q" of a toroidal core. In particular, the present invention is directed to the provision of a multiple turn device for surrounding the core of an electrical toroid with a large plurality of turns of electrical winding in such a manner that same may be readily disengaged from the core and to the end of providing means for testing magnetic properties of such cores.

It is conventional in the art to employ testing devices for determining the permeability of toroidal cores prior to the application of windings thereto in order to insure the desired properties of the resultant wound core. In this respect there are commonly employed devices generally termed multiple turn cups comprising a pair of disengageable elements which in connection encompass a core to be tested and provide a number of turns of electrical conductor about the core whereby energization of such conductor may be accomplished to determine desired properties of the core. Difficulties are encountered in the utilization of such multiple turn cups for the testing of small toroidal cores in that the number of winding turns that may be disengageably disposed about the core is seriously limited. This limitation arises from the very small center opening through small toroidal cores, for although a large number of electrical conductors may be readily passed through even small openings, substantial difficulties have been encountered in attempting to provide suitable contacts therefore whereby a complete winding path may be provided about the core. It is conventional in this respect for multiple turn cups to employ mercury pools as connectors or, alternatively, pressure surfaces generally plated with precious metals or the like. Both of the foregoing alternatives are disadvantageous in being expensive and as generally requiring a substantial volume for each connection whereby the number of connectors that can be fitted into a limited space is insufficient to complete more than a few winding turns about the core. It is, in fact, common for multiple turn cups employed in the measuring of toroidal cores to be limited to no more than fourteen turns.

The present invention is directed particularly to overcoming the foregoing and other limitations of the prior art as regards the testing of toroidal cores of small size. It will be appreciated that in the measurement of core permeability it is highly desirable for the winding inductance to be very large in comparison with the winding resistance and this is of particular importance at low frequency values. Herein the winding resistance, which necessarily includes two contacts per turn of the winding in order for same to be disengageable from the core, is minimized by the provision of a particularly advantageous type of connector. Furthermore, the number of turns disengageably disposed about the core under test is herein maximized by the provision of cascaded connectors at the center of the core wherein a large number of electrical conductors may be removably disposed through the central core opening and electrically connected to the return portion of the winding without physical interference between the contacts.

It is the object of the present invention to provide a separable winding having a large multiplicity of turns for removable disposition about a toroidal core for the testing thereof.

It is another object of the present invention to provide a testing device for small toroidal cores and having a large plurality of windings adapted for rapid engagement and disengagement in encircling relationship with such cores.

It is a further object of the present invention to provide a multiple turn cup for toroidal core testing having in excess of fourteen turns of electrical conductor adapted for rapid engagement and disengagement about such cores with sliding electrical contacts in the conductor circuit.

It is still another object of the present invention to provide apparatus for measuring the permeability of a toroidal core and having a large plurality of turns of electrical winding adapted for ready engagement about such cores and further having a low winding resistance.

It is yet another object of the present invention to provide a multiple turn cup for toroidal core testing having low resistance contacts and a large number of winding turns completed by cascaded contact disposition.

It is yet another object of the present invention to provide a multiple turn cup with a radially vaned member adapted for extension through a toroidal core opening and adapted to engage individual vanes thereof with offset female connectors to complete a multiple turn electrical winding about a toroidal core.

Various other possible objects and advantages of the present invention will become apparent to those skilled in the art from the following description and the accompanying drawing of a single preferred embodiment of the present invention. It is not, however, intended that the illustrated embodiment of this invention shall in any way be taken as limiting but instead reference is made to the appended clams for a precise delineation of the scope of the present invention.

The present invention is illustrated as to a single preferred embodiment thereof in the accompanying drawings wherein.

Figure 1:
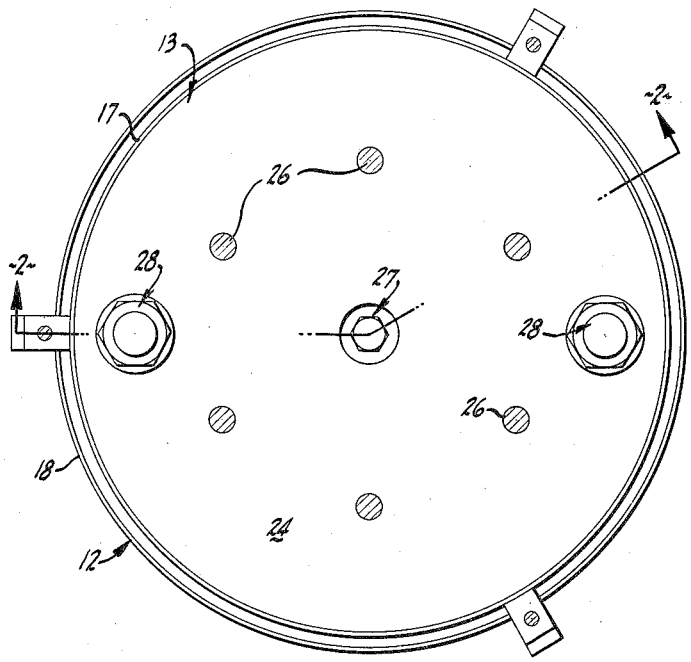
Fig. 1 is a plan view of the device.
Figure 2:
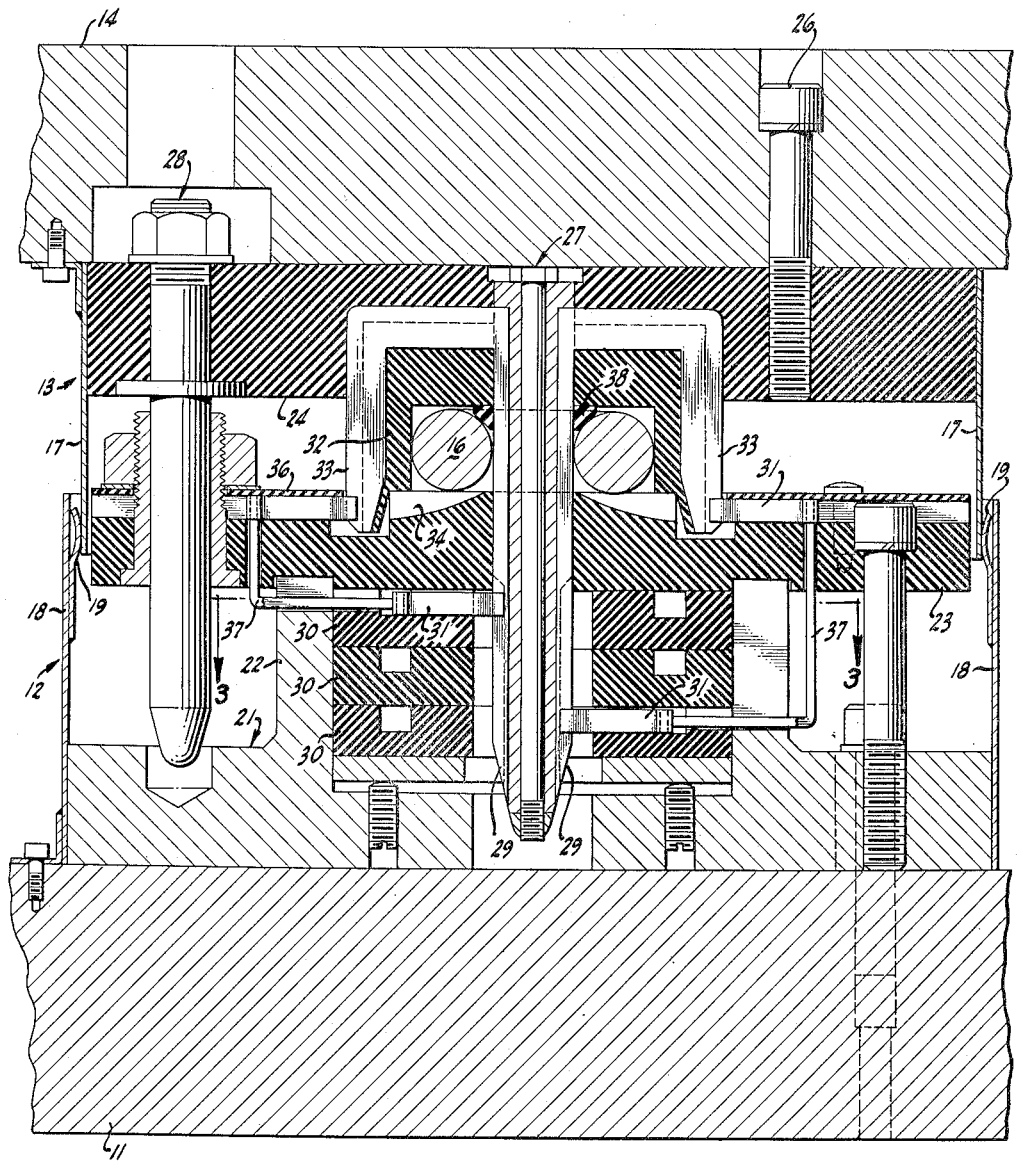
Fig. 2 is a vertical sectional view taken in the plane 2—2 of Fig. 1.

Considering now the illustrated embodiment of the invention in some detail and referring first to Figs. 1 and 2 of the drawings, it will be seen that there is provided a base member 11, generally termed in the art a lower shoe, upon which there is firmly affixed a lower cup 12. An upper cup 13 is also provided, mounted, for example, beneath a vertically movable upper member or shoe 14 as illustrated. Suitable means, not shown, may be provided for vertically displacing the upper cup 13 in a controlled manner so as to disengage the lower cup for the placement of a toroidal core 16 thereon to be tested and for engaging the lower cup to encircle a toroidal core for the testing thereof. An outer cylindrical wall 17 is provided about the lower cup 12 and a like cylindrical outer wall 18 about the upper cup fits within same. Positive engagement of the cups may be insured by one or more spring clips 19 about the inner circumference of the lower cup wall 17 and bearing upon the upper cup wall during cup engagement.

The lower cup 12 includes in addition to the outer wall 18, a bottom disc 21 having a central aperture therein and an upstanding cylindrical boss 22 thereon defining a cylindrical chamber atop the disc. Resting upon the cylindrical boss 22 is an upper insulating disc 23 attached as by bolts to the bottom disc 22 and having a central vertical opening or bore therethrough. The upper cup 13 includes an insulating plate 24 extending between the exterior cup wall 17, secured as by bolts 26 to the upper shoe 14, and also a central pin 27 extending through the upper plate 24 and depending from the upper cup for extension through the central aperture in the disc 23 of the lower cup 12. Two or more elongated aligning pins 28 are secured to the upper cup plate 24 and depend therefrom for insertion in insertion in sleeved apertures in the lower cup disc 23 whereby exact alinement of the upper and lower cups is insured.

Figure 3:
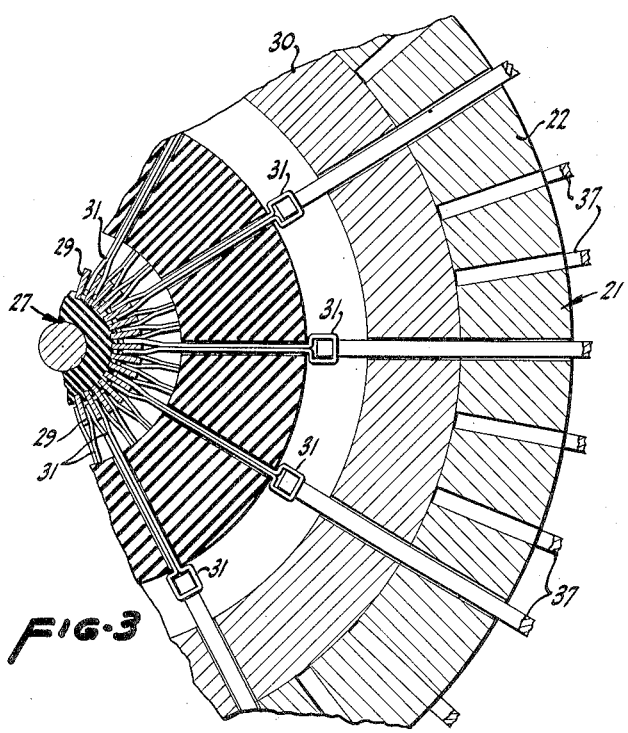
Fig. 3 is a partial sectional view taken in the horizontal plane 3—3 of Fig. 2, with a reduced number of contacts for ease of illustration.
Figure 4:
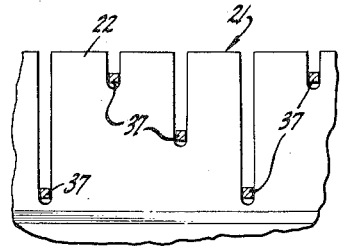
Fig. 4 is a schematic illustration of the relative disposition of the female connectors of the lower cup of the device of the present invention.

The electrical circuit of the present invention includes in part the upper cup pin 27 which is formed of an insulating material with a central bolt therethrough and having a plurality of radially spaced longitudinal slots formed about the circumference of the pin. Within these slots there are disposed an inner set of electrically conducting vanes formed, for example, of thin bronze strips and extending radially outward of the pin. These inner vanes 29 are disposed in close proximity and yet out of electrical contact with each other, as may be best seen in Fig. 3 of the drawings. The outer diameter of the pin 27, including the vanes 29 thereon, is made less than the diameter of the opening in a toroidal core to be measured so that the pin 27 readily moves through the core opening. Within the lower cup 12 there are provided an inner set of female connectors 31 adapted to individually engage separate vanes 29 of the pin 27 in the upper cup. These female connectors may be horizontally mounted in radial and annular slots formed in centrally apertured insulating discs 30 tightly stacked within the upstanding cylindrical boss 22 of the lower disc of the bottom cup. The female connectors 31 extend radially inward of the cylindrical bore vertically through the insulating plate 23 and discs 30 and are therein disposed in cascaded or vertically offset relation, as best illustrated in Fig. 4 of the drawings. The lateral or horizontal separation of the female connectors 31 about the central bore in the plate 23 is made exactly equal to the lateral or circumferential separation of adjacent vanes 29 on the pin 27 so that upon insertion of the pin 27, each vane thereof will slide into and electrically contact one of the female connectors. The actual lateral separation of the female connectors will be seen to be such that they would ordinarily engage one another. However, by offsetting adjacent connectors in a vertical direction it is herein possible to insure complete electrical separation and insulation therebetween. The individual female connectors, as illustrated in Fig. 2, include an inner pronged end having a prong separation just sufficient to encompass an individual vane 29 and the prongs are sufficiently resilient to firmly engage the vane to provide good electrical contact therewith. The opposite or outer end of the female connector 31 is formed as a hollow rectangle also having an axial aperture therein whereby electrical leads may be readily inserted and affixed thereto as by soldering. While various materials may be employed in the structure of the female connector 31 it has been found suitable to utilize beryllium copper in this respect and in no event is it necessary to employ precious metals upon the contacting surfaces.

Figure 5:
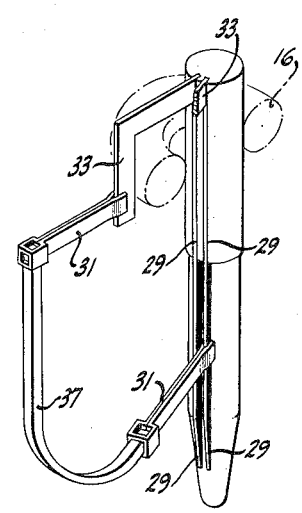
Fig. 5 is a perspective view of the elements forming one turn of the electrical windings of the present invention.

A complete electrical circuit about a core 16 is herein provided by extension of the vanes 29 upwardly into the upper cup plate 24 and thence radially outward wherein same are fixed in position as by insertion in radial slots formed in an insulating cylindrical member 32 embedded in the plate 24 about the pin 27. The vanes 29, or extensions 33 thereof electrically connected to the vanes, extend longitudinally downward of this member 32 to circumferentially displaced positions about the bottom of the upper cup 13 whereat same are available for engagement with further electrical contacts on the lower cup 12. The element 32 of the upper cup 13 has an upwardly extending depression centrally thereof to define with the pin 27 extending through this element 32, an annular chamber adapted to encompass a toroidal core 16 that may be disposed atop the lower cup 12, as illustrated in Fig. 2 of the drawings. Suitable connections of the outer set of vanes 33 on the upper cup 13 to the lower cup 12 may be readily accomplished inasmuch as these outer vanes 33 are disposed upon a circle of much greater radius than those of the inner vanes; however, it is here preferred to employ the same female connectors 31 in this respect. Mounting of the outer set of female connectors 31 may be readily accomplished by forming radial slots 34 in the upper surface of the disc 23 with these slots being alined with the outer vanes 33 upon the upper cup 13. Within each of the slots 34 there is disposed a female connector 31 with the pronged end thereof disposed radially inward to thereby individually engage a single vane 33 of the upper cup. These female connectors 31 comprising the outer set thereof may be maintained in position by a cover 36 affixed to the disc 23 as illustrated. Electrical leads 37 are secured as by soldering one to each of the inner set of female connectors 31 extending outwardly through the boss 22 and thence vertically upward through appropriate apertures formed in the disc 23 into electrical contact with individual electrical connectors 31 of the outer set thereof. In this respect please note that in order for a complete electrical path to be provided by the foregoing electrical connections and for same to have a multiplicity of connected turns it is necessary for each of the vanes 29, for example, to be electrically connected through the lower cup to the next adjacent vane 29. Thus it will be seen in Fig. 5 that a complete electrical circuit may be traced from a vane 29 on the central pin 27 of the upper cup 13 through a female connector 31 engaging such vane and thence through an electrical lead 37 to a female connector 31 of the outer set thereof which in turn electrically contacts an outer vane 33 which is joined to the next adjacent vane 29 on the central pin. While it is possible for this connection between alternate vanes to be accomplished at a variety of places throughout the circuit, such is herein illustrated as being carried out by the electrical leads 37, for as shown in Fig. 5, it is the next adjacent contact 31 to the contact engaging the illustrated vane 29 which is directly connected by the lead 37 to the outer contact 31 of the lower cup. In this manner then the electrical circuit, completed by placing the upper cup upon the lower cup and fully engaging same to insert the central pin 27 in the lower cup to complete both inner and outer vane connections, forms a single multi-turn circuit about a core 16 disposed between the two cups surrounding the central pin 27. External electrical connections to this circuit may be readily accomplished at desired points thereon, preferably at the lower cup. Thus, external electrical leads may be provided by cutting the electrical conductor 37 at the right of Fig. 2, for example, and extending the ends so formed outside the cup whereby appropriate electrical energization of the circuit may be accomplished and further whereby appropriate readings may be made for obtaining desired data relating to the core.

Complete shielding of the core is afforded by the total enclosure provided. External stray magnetic fields are excluded from the interior of the engaging cups by the walls 17 and 18 and engaging clip 19.

A further important point of the present invention, bearing in mind that same is particularly adapted to the testing of toroidal cores of very small size, is the necessary exact centering of the cores during test. It will be appreciated that radial displacement of a core 16 will provide variations in the characteristics thereof as measured with the present invention. Inasmuch as this invention is adapted to handle cores of varying sizes there is herein provided means for insuring proper centering of cores under test. Although provision may be made upon either upper or lower cup for centering cores disposed in position for test, particular advantage lies in maintaining the top of the lower cup substantially planar in order that automatic core handling devices may be employed to position cores upon the cup for test and to remove same after test. Consequently, in the present invention there is provided centering means only upon the upper cup and such herein comprises a tapered soft rubber washer, or the like 38, disposed about the central pin 27 engaging the element 32 at the top of the depression therein. The washer 38 is resiliently compressible so as to thereby accommodate cores of varying sizes which may be placed upon the lower cup 12. Upon lowering of the upper cup 13 with the pin 27 passing through the central opening of the core 16, the washer 38 will come in contact with the core 16 as the upper and lower cups fully engage and the washer 38 will be compressed by the core 16 so as to thereby automatically center the core 16 about the pin 27.

Operation of the above-described invention follows directly from the above description thereof. As previously noted, the two cups of the device are controllably separable and when separated a toroidal core 16 to be tested may be either manually or automatically positioned atop the lower cup 12 alined with the opening in the upper disc 23 thereof. With the toroidal core 16 so positioned, the upper cup 13 is then lowered upon the lower cup 12 to first engage the alining pins 28 with appropriate apertures in the lower cup so that upon continued lowering of the upper cup 13 the central pin 27 thereof passes downward through the toroidal core 16 and thence further into the lower cup to engage individual vanes 29 upon this pin with individual electrical contacts 31 of the lower cup. Completion of the lowering of the upper cup 13 to fully engage the cups, lowers the outer vanes 33 into electrical contact with individual contacts of the outer set of contacts on the lower cup so as to thereby complete a multi-turn electrical circuit about the toroidal core 16. During the final phase of this cup engagement the resilient washer 38 within the upper cup 13 engages the toroidal core 16 to automatically center same about the central pin 27. By the provision of the vaned central pin 27 engaging cascaded female electrical connections in the lower cup it is herein possible to provide a large number of turns of electrical connection about the core under test. The physical limitations formerly preventing such multiturn arrangements as is herein presented, is overcome by the present invention. Furthermore, the type of electrical contacts herein employed provide such advantageous electrical and mechanical connection that no particular or expensive provision need be made to insure good electrical contact. In particular, prior practices of employing mercury pool connections or contact plating with precious metals is herein precluded with a consequent substantial saving in the cost of the overall device.

The present invention is particularly well adapted to the automatic and high-speed handling of small cores for the testing thereof to determine either the number of turns of winding required thereon to obtain the desired value of inductance or to reject the cores as having a permeability outside of a tolerable range thereof. Conventional permeability testing methods clearly show the value of employing a large number of turns in the determination of permeability of cores and further in the minimization of the resistance of the test winding. Herein there is provided not only a large number of core turns relative to those available in the prior art, but also the series resistance of the windings including the connectors, necessarily forming a part thereof, is minimized to a material extent. It will be appreciated that inasmuch as the basic inductance of a toroid is a function of the square of the number of turns and the series resistance is proportional to the number of contacts, that the sensitivity of the present invention with, for example, 36 turns is nearly seven times as great as prior art devices having, for example, fourteen turns, and that therefore measurements made with the present invention will be nearly seven times as accurate as those available with prior art devices.

What is claimed is:

1. A core testing device comprising a lower member having a central opening therein and adapted to receive a core atop same about said opening, a plurality of interior female electrical contacts disposed within said opening and consecutively staggered longitudinally of same circumferentially about said opening, a plurality of outer electrical contacts about the exterior of said lower member, means individually connecting said interior and exterior contacts, an upper member adapted for engagement with said lower member atop same for enclosing a core atop the latter and having a central depending pin adapted to fit within the central opening in said lower member through a core disposed thereon, a plurality of elongated electrical male contacts disposed longitudinally upon said depending pin and spaced circumferentially thereabout in insulated relationship therebetween, a plurality of electrical contacts depending from said upper member radially outward of said pin and adapted to engage the outer electrical contasts of said lower member upon engagement of said upper and lower members, and means alining said upper and lower members upon engagement thereof for alining the contacts of the upper member with those of the lower member of providing thereby a multi-turn electrical path about a core disposed therebetween.

2. A core testing device as claimed in claim 1 further defined by the interior female electrical contacts of said lower member each comprising a pair of adjacent resilient prongs extending into the central opening of said lower member for slidably engaging an elongated contact of the depending pin upon said upper member in resilient gripping relationship thereto for forming good electrical contact therewith.

3. A core testing device as claimed in claim 1 further defined by said pin depending from said upper member comprising an elongated insulator having a plurality of longitudinal slots formed in circumferentially spaced relationship thereabout, and a plurality of thin elongated electrically-conducting metallic strips inserted one in each of said pin slots in insulated relationship to each other for defining upon said pin a plurality of male electrical connectors.

4. A multiple turn cup for testing toroidal cores comprising an upper cup having an insulating pin depending therefrom for insertion through a toroidal core, a plurality of electrically conducting vanes disposed longitudinally of said pin and spaced apart circumferentially thereof, a lower cup having a pin aperture therein, a plurailty of electrical connectors disposed within said lower cup and extending into said pin aperture thereof with each connector including resilient double prongs, said connectors being divided into groups thereof circumferentially spaced about said pin aperture and the individual connectors of each group being offset with respect to each other both circumferentially of said aperture and axially thereof, and electrical contacts disposed upon said upper member and lower member radially outward of said pin for contacting each other individually upon engagement of said upper and lower cups to form with the aforesaid connections a multi-turn electrical winding about an annular space defined between said cups in engagement.

5. A multiple turn cup for testing the permeability of toroidal cores comprising an upper cup formed of insulating material and defining an elongated, depending cylindrical pin together with a cylindrical member about said pin and defining therewith an annular core-receiving chamber, a pair of alining pins secured to said upper cup and depending therefrom in fixed relation thereto, a large plurality of elongated electrically-conducting interior vanes disposed longitudinally upon said pin and spaced apart circumferentially thereof, a plurality of electrically-conductive outer vanes disposed about said cylindrical member in radial extension therefrom and individually electrically connected to separate interior vanes upon said pin, a lower cup including electrically insulating members defining a central pin bore adapted to receive the upper cup pin and a pair of spaced elongated apertures disposed to receive in sliding relation said alining pins for insuring exact alinement of said pin and pin bore, a plurality of inner resiliently pronged electrical connectors disposed in relatively insulated relation extending into said pin bore and in equal number to the number of interior vanes upon said pin, said electrical connectors being divided into groups spaced circumferentially about said pin bore with the individual connectors of each group being offset both circumferentially and longitudinally of said bore whereby said connectors individually slidably engage separate vanes upon said pin without electrical contact between adjacent contactors, a plurality of outer electrical connectors disposed adjacent the top of said lower cup about a circle and in circumferentially spaced relationship to each other in position to individually engage in resilient sliding relationship the vanes of said outer group of vanes on said upper cup, and electrical leads extending from said inner connectors to said outer connectors with each lead extending from one connector of the lower plurality thereof to the individual connector of the upper plurality thereof next displaced circumferentially therefrom, whereby there is formed in engaged position of said upper and lower cups a multi-turn electrical winding about said core chamber for the passage of current therethrough in the testing of toroidal cores disposed within said chamber.

References Cited in the file of this patent

UNITED STATES PATENTS

| | | |
|---|---|---|
| 1,570,948 | Crouch | Jan. 26, 1926 |
| 1,695,679 | Berlowitz | Dec. 18, 1928 |